Patented July 17, 1951

2,560,555

UNITED STATES PATENT OFFICE 2,560,555

REDUCTION OF ORGANIC NITRO COMPOUNDS TO AMINES

Paul C. Condit, Berkeley, Calif., assignor, by mesne assignments, to California Research Corporation, San Francisco, Calif., a corporation of Delaware No Drawing. Application August 18, 1943, Serial No. 499,111

29 Claims. (Cl. 260—580)

This invention relates to the reduction of organic nitro compounds to the corresponding amines by means of hydrogen in the presence of a catalyst. More particularly, it relates to the preparation of amines by the controlled hydrogenation of the corresponding nitro compounds in the presence of catalysts comprising the sulfides of the metals of groups V and VI of the Periodic System according to Mendeleeff, that is, the sulfides of vanadium, columbium, tantalum, chromium, molybdenum and tungsten.

The catalytic reduction of organic nitro compounds to amines has been disclosed heretofore, both in the liquid and vapor phase, and numerous latalysts have been suggested as suitable for the purpose, but it has been found that such catalysts have various deficiencies, particularly the following, as exemplified by the reduction of nitrobenzene to aniline: the reduction does not go to completion; bimolecular reduction products such as azobenzenes and hydrazobenzenes are formed; the ring may be reduced or ammonia split out by hydrogenolysis, and ammonia, benzene, cyclohexane, cyclohexyl amine, dicyclohexyl amine and cyclohexyl aniline formed. When otherwise suitable for the purpose, the prior catalysts require very low liquid space rates, high hydrogen flow rates, may be difficult or expensive to prepare, operate only within narrow temperature ranges and are readily poisoned by impurities.

The processes of this invention accomplish the desired amine preparations wthout the production of any considerable proportions of bimolecular or ring-reduction products, when nitro aromatics are being reduced, and may be carried out in liquid or vapor phase, at atmospheric pressures, batchwise or continuously, at high liquid space rates and low hydrogen flow rates, with catalysts whose preparation is simple and relatively inexpensive and with hydrogen which may contain very considerable quantities of inert diluents, carbon monoxide and sulfur compounds.

It is accordingly a purpose of the invention to disclose and provide methods of producing organic amines by the controlled hydrogenation of the corresponding nitro compounds, in the presence of catalysts and under conditions such that the desired reactions are brought to completion at high space rates and low hydrogen flow rates, in liquid or vapor phase, in batch or continuous flow, without undue production of reduction products of other than the desired character. Other objects and advantages of the invention will be apparent to those skilled in the art from a detailed discussion of the steps, conditions and elements embraced by the processes thereof.

As aforesaid, the hydrogenation catalysts referred to herein as suitable in the practice of the invention comprise the sulfides of the metals of groups V and VI of the Periodic System according to Mendeleeff, that is, the sulfides of vanadium, columbium, tantalum, chromium, molybdenum and tungsten, and they may be employed alone or in admixture with each other or in admixture with the oxides or sulfides of the alkali metals, the alkaline earth metals, zinc, aluminum and silicon.

The preparation of suitable catalysts may be exemplified in connection with the laboratory preparation of a molybdenum sulfide catalyst:

Activated carbon, of the sort readily available commercially, is immersed for one hour in a solution prepared by dissolving 235 grams of 85% molybdic acid in one liter of 15% ammonium hydroxide solution. The excess liquid is drained off and hydrogen sulfide gas passed through the mass until it is thoroughly saturated. The treated mass is then dried in a stream of nitrogen or carbon dioxide and, before use, the dried mass is treated for about one hour with a slow stream of hydrogen, at atmospheric pressure and at a temperature of 500°–600° F. In larger scale practice, the catalyst is sulfured in place in the reducing chamber under superatmospheric pressure and at temperatures of 500°–600° F. by recycling hydrogen with additions of carbon disulfide; under these conditions the carbon disulfide is reduced to hydrogen sulfide, which may be used directly if desired. Other suitable methods of preparing catalysts which may be employed in the practice of the invention are disclosed in the specifications of United States Letters Patents Nos. 1,894,785, 1,955,253, 2,039,259, 2,045,795, 2,100,352, 2,112,292 and 2,123,623.

Silica gel, activated alumina, kieselguhr and the like porous supports may be employed in place of the activated carbon particularly referred to, although the activated carbon, screened to 10–14 or other suitable mesh, is preferred in the practice of the invention, since the activated carbons are unusually rugged to abrasion and erosion by liquid streams, when the operations are carried out in continuous liquid phase, are light in weight and have high activity at lower pressures; moreover, they have less tendency to cause cracking of the destructive type than do many of the more usual porous supports.

*Example 1.—Nitrobenzene to aniline, atmospheric pressure, continuous*

Vaporized and preheated nitrobenzene containing 1% by volume of carbon disulfide was passed at a rate of 15 cc. (liquid) per hour through a one-half-inch diameter stainless steel tube carrying 60 cc. of a 10–14 mesh molybdenum sulfide-on-activated carbon catalyst prepared as described above, at atmospheric pressure, accompanied by hydrogen at a rate equivalent to 200% of that theoretically required for the reduction of the nitrobenzene to aniline; the temperature of the body of the catalyst was held at about 605° F. The reaction products were collected in a condensing system following the reaction chamber. Of the reaction products, about one-fourth was water and three-fourths water-immiscible organic liquid; 98% of the organic liquid was soluble in dilute hydrochloric acid and consisted substantially entirely of aniline.

In operations of this character, temperatures between 350° and 700° F. are satisfactory, although temperatures between 450° and 650° F. are preferable, and nitrobenzene and hydrogen flow rates may be varied over wide limits.

*Example 2.—Nitrobenzene to aniline, atmospheric pressure, continuous, dilute hydrogen*

Nitrobenzene containing 1% by volume of carbon disulfide was vaporized and passed at a rate of 20 cc. (liquid) per hour through a 20-inch glass tube containing 180 cc. of a molybdenum sulfide-on-activated charcoal catalyst, accompanied by a gaseous mixture comprised of 60% hydrogen and 40% methane at a rate of 908 cc. per minute. The catalyst mass was maintained at 710°-740° F. and substantially atmospheric pressure. Upon condensation, the reaction products separated into two layers; the water-immiscible layer was extracted with dilute aqueous hydrochloric acid solution, the extract separated from the undissolved liquid and the HCl-soluble fraction recovered by neutralization with dilute sodium hydroxide solution. Virtually the entire product distilled at the boiling point of aniline and the 10-99% cut had a refractive index of 1.5849 at 20° C. The dilute HCl-insoluble portion of the crude reaction product distilled at the boiling point of nitrobenzene. No other reaction products were identifiable.

*Example 3.—Nitrobenzene to aniline, superatmospheric pressure, autoclave*

300 cc. of nitrobenzene, 3 cc. of carbon disulfide and 150 cc. of the above molybdenum sulfide-on-activated carbon catalyst were charged to an autoclave of the rocking type. The autoclave was pressured with hydrogen to between 1200 and 1800 lbs./sq. in., and the temperature raised to 550 F. The reaction set in when the temperature reached about 450° F. as evidenced by a drop in hydrogen pressure, and the reaction was substantially complete in about 2 hours. The reaction products were filtered free of catalysts: 295 cc. were obtained, 65 cc. of which comprised an aqueous layer. The water was separated and 150 cc. of the crude organic product charged to a small still with an 18-inch open column and vaporized at atmospheric pressure. A 10% forerun, half of which was water, was discarded; the 10-85% cut boiled between 357° and 365° F., of which the 40-70% cut was segregated. Its specific gravity was 1.015 at 74° F. and its refractive index was 1.5840 at 23° C. Two analyses by the acetic anhydride method indicated that this cut was essentially chemically pure aniline (100.1 and 101.8% aniline, respectively).

*Example 4.—Nitro-meta-para-xylene to mixed xylidines, superatmospheric pressure, autoclave*

300 cc. of a mixture of nitroxylenes prepared by the nitration of a meta-para-xylene cut recovered from the heavy bottoms of a crude toluene fraction prepared in the catalytic aromatization of petroleum hydrocarbons and boiling at 453°-471° F., 3 cc. of carbon disulfide and 150 cc. of a molybdenum sulfide-on-activated carbon catalyst were treated in a rocking type autoclave initially pressured with hydrogen to 1100 lbs./sq. in. Reaction began at about 450° F. and was substantially complete in one-half hour; the temperature was raised to 500° F. and shaking continued for 4 hours. The product was purified as in Example 3 and a 175 cc. cut boiling between 410° and 426° F. was segregated for investigation: it was completely soluble in dilute hydrochloric acid, consisting of mixed xylidenes with a refractive index $n_D$ at 20° C. of 1.5594 and a specific gravity of 0.9752 at 60° F.

*Example 5.—Nitroxylene to xylidene, atmospheric pressure, continuous*

Nitroxylene having a boiling range of 195°-201° F. at 4 mm. mercury pressure, prepared from nitration-grade xylene, accompanied by 1% by volume of carbon disulfide, in preheated vapor form, was passed through a stainless steel tube containing a 10-14 mesh molybdenum sulfide-on-activated carbon catalyst at a space rate of 0.25 volume liquid feed per volume catalyst space per hour at a maximum catalyst temperature of 622° F. The nitroxylene vapors were accompanied by hydrogen in an amount 400% of that theoretically required for the reduction of the nitroxylene to xylidine. At the end of 6 hours of operation, the organic reaction product was still water-white in color and 100% soluble in dilute aqueous hydrochloric acid.

*Example 6.—Nitrobenzene to aniline, superatmospheric pressure, continuous*

Nitrobenzene containing 1% by volume of carbon disulfide was vaporized, preheated and passed in contact with a 10-14 mesh molybdenum sulfide-on-activated charcoal catalyst at varying space rates and molecular ratios of hydrogen to nitrobenzene, the catalyst chamber being maintained at between 390 and 410 lbs./sq. in. gauge pressure, as follows:

| | 6A | 6B | 6C |
|---|---|---|---|
| Duration of run, hrs. | 6 | 6 | 3 |
| Space rate, v./v. hr. | 0.5 | 1.0 | 1.75 |
| Molar ratio hydrogen, per cent theoretical | 1,100 | 500 | 800 |
| Maximum catalyst temperature, degrees F. | 606 | 643 | 600 |
| Organic reaction product, per cent soluble in HCl | 99.5 | 99.5 | 100 |

*Example 7.—Mixed nitroxylenes to mixed xylidines, superatmospheric pressure, continuous*

A mixture of nitroxylenes prepared by the nitration of nitration grade ("3°") xylene, 1% by volume of carbon disulfide, was vaporized, preheated and passed into contact with a 10-14 mesh molybdenum sulfide-on-activated carbon catalyst prepared as described above, at 400 lbs. gauge pressure, a space rate of 2 volumes liquid feed per volume catalyst space per hour, accompanied by hydrogen in an amount 800% of that theoretically required for the reduction of nitroxylene to xylidine. The maximum temperature of the catalyst body was 644° F. and the operation continued for 2½ hours. The organic reaction products were 96% soluble in dilute hydrochloric acid solution; the hydrochloric acid-insoluble organic reaction products consisted of mixed aromatic and naphthenic hydrocarbons, some of which were formed by the hydrogenation of impurities in the feed stock and some of which were formed by hydrogenolysis.

*Example 8.—Nitropropane to propyl amines; atmospheric pressure; continuous*

A commercial grade of 1-nitropropane containing 1% by volume of carbon disulfide was vaporized and passed at a rate of 20–25 cc. (liquid) per hour through a 20-inch glass tube containing 180 cc. of a molybdenum sulfide-on-activated carbon catalyst prepared as described above. Hydrogen was fed at the rate of 1500 cc. per minute. The catalyst mass was held at a temperature between 650° and 700° F. and substantially atmospheric pressure. A mixture of normal propyl and isopropyl amines was produced, together with small amounts of ammonia and of a HCl-insoluble, non-basic oil containing 6.5% sulfur; no 1-nitropropane was found among the reaction products.

Generally, operation under superatmospheric pressure has been found to increase the life of the catalyst. Likewise, an excess of hydrogen over that theoretically required is essential for large yield and for the maintenance of high catalyst activity, at least five times the theoretical requirement being preferable. In the reduction of both nitroaliphatic and nitroaromatic compounds, temperatures between about 350° and about 700° F. may be employed; temperatures between 450° and 650° F. are optimum, as at 650° F. and higher decomposition products begin to appear. Considerable advantage is derived from operations at 2000–3000 pounds gauge pressure and above, thereby maintaining both the initial nitro compounds and the produced amines in liquid phase, in batch and particularly in continuous operations: the effective temperature of reduction is considerably reduced, with consequent diminution of by-product formation; heat of reaction is more readily controlled, and this increased ease of control may be enhanced by the introduction of inert liquids with the nitro compounds charged. In large scale continuous operations, where maximum space rates and long periods of continuous operation are of high economic interest, dilution of the nitro-aromatic feed stock with relatively small amounts of inert materials, such as hydrocarbons, are not detrimental and may be beneficial, particularly in the event that the temperature of the catalyst mass is desired to be held at the highest permissible point.

The catalysts found suitable in the practice of the invention are "sulfactive": their activity is not decreased by the presence of even considerable amounts of sulfur compounds in the materials subjected to their action; moreover, their catalytic activity for the purposes of the invention is maintained at its highest state by the controlled addition of small amounts of hydrogen sulfide or hydrogen sulfide-producing compounds to the feed stream entering the catalyst mass. To this end, in the absence of sulfur containing impurities in the feed stock, $H_2S$, $CS_2$, low molecular mercaptans or analogous compounds should be introduced, as exemplified hereinabove; throughout the catalytic operations of the invention, the state of the catalyst in this respect may be ascertained by an occasional determination of $H_2S$ in the gases effluent from the catalyst chamber, and it has been found that the $H_2S$ content of the gases effluent from the catalyst chamber should be at least about 50 grains per 100 cu. ft.

Although the invention has been exemplified most particularly in connection with the reduction of certain mono-nitro aliphatic and aromatic compounds and the alkyl derivatives thereof, it is not to be understood as limited thereto, as the more complex organic nitro compounds may be reduced to the corresponding amine derivatives in similar manner. In all cases, the catalysts employed in the practice of the invention are highly selective in their action, as aforesaid, and are capable of long use at high conversion rates, without the production of significant or disturbing proportions of bi-molecular or degradation products.

I claim:

1. A process which comprises forming an amine by hydrogenating the nitro group of an organic nitro compound, and catalyzing said reaction at a temperature of from about 350 to 700° F. with a compound selected from the group consisting of sulfides of vanadium, columbium, tantalum, chromium, molybdenum and tungsten.

2. A process which comprises forming an amine by hydrogenating the nitro group of an organic nitro compound, catalyzing said reaction at a temperature of from about 350 to 700° F. with a compound selected from the group consisting of sulfides of vanadium, columbium, tantalum, chromium, molybdenum and tungsten, and maintaining catalyst activity by effecting said hydrogenation in the presence of an active sulfur carrier.

3. A process which comprises forming an amine by hydrogenating the nitro group of an organic nitro compound, catalyzing said reaction at a temperature of from about 350 to 700° F. with a compound selected from the group consisting of sulfides of vanadium, columbium, tantalum, chromium, molybdenum and tungsten deposited upon a porous inert support, and maintaining catalyst activity by effecting said hydrogenation in the presence of an active sulfur carrier.

4. A process which comprises forming an aromatic amine by hydrogenating a nitro group of a nitro aromatic hydrocarbon of the benzene series and catalyzing said reaction at a temperature in the range of from about 450° F. to about 650° F. with a molybdenum sulfide catalyst.

5. A process of producing an amine which comprises passing a corresponding nitro compound through a body of sulfactive hydrogenating catalyst essentially consisting of a compound selected from the class of the sulfides of vanadium, columbium, tantalum, chromium, molybdenum and tungsten, simultaneously introducing to the catalyst body hydrogen in a molecular ratio at least twice that theoretically required for the reduction of the said nitro compound to the corresponding amine and an active sulfur carrier in proportions sufficient to maintain the catalytic activity of the said catalyst, and maintaining the catalyst body at a temperature within the range 350°–700° F.

6. A process as in claim 5, in which the catalyst body is maintained under a pressure of above 2000 pounds gauge, sufficient to maintain the initial nitro compound and the produced amine in liquid phase.

7. A process as in claim 5, in which the initial nitro compound is an aromatic nitro compound.

8. A process as in claim 5, in which the initial nitro compound is an aliphatic nitro compound.

9. A process of producing an aromatic amine which comprises passing an aromatic nitro compound in vapor form through a body of sulfactive hydrogenating catalyst essentially consisting of a compound selected from the class of the sulfides of vanadium, columbium, tantalum, chromium, molybdenum and tungsten, simultaneously introducing to the catalyst body hydrogen in a molecular ratio at least twice that theoretically required for the reduction of the said aromatic nitro compound to the corresponding amine and an active sulfur carrier in proportions sufficient to maintain the catalytic activity of the said catalyst, and maintaining the catalyst body at a temperature within the range 450°–650° F.

10. A process of producing an aromatic amine which comprises passing an aromatic nitro compound in vapor form through a body of sulfactive hydrogenating catalyst essentially consisting of a compound selected from the class of the sulfides of vanadium, columbium, tantalum, chromium, molybdenum and tungsten, simultaneously introducing to the catalyst body hydrogen in a molecular ratio at least twice that theoretically required for the reduction of the said aromatic nitro compound to the corresponding amine and an active sulfur carrier in proportions sufficient to maintain the catalytic activity of the said catalyst, and maintaining the catalyst body at a temperature within the range 400°–625° F. and at superatmospheric pressure.

11. A process of producing an aromatic amine which comprises passing an aromatic nitro compound in vapor form through a body of sulfactive hydrogenating catalyst essentially consisting of a compound selected from the class of the sulfides of vanadium, columbium, tantalum, chromium, molybdenum and tungsten, simultaneously introducing to the catalyst body hydrogen in a molecular ratio at least four times that theoretically required for the reduction of the said aromatic nitro compound to the corresponding amine and an active sulfur carrier in proportions sufficient to maintain the catalytic activity of the said catalyst, and maintaining the catalyst body at a temperature within the range 400°–625° F. and at a superatmospheric pressure of at least 400 lbs. gauge.

12. A process of producing aniline from mono-nitrobenzene which comprises passing the nitrobenzene through a body of hydrogenating catalyst comprising molybdenum sulfide supported on activated carbon, simultaneously introducing to the catalyst body hydrogen in the proportion of at least four times that theoretically required for the reduction of the nitrobenzene to aniline and an active sulfur carrier in proportions sufficient to maintain the catalytic activity of the said molybdenum sulfide, and maintaining the catalyst body at a temperature within the range 400°–625° F. and under superatmospheric pressure.

13. A process of producing a xylidine from a mono-nitroxylene which comprises passing the nitroxylene through a body of a hydrogenating catalyst comprising molybdenum sulfide supported on activated carbon, simultaneously introducing to the catalyst body hydrogen in the proportion of at least four times that theoretically required for the reduction of the nitroxylene to xylidine and an active sulfur carrier in proportions sufficient to maintain the catalytic activity of the said molybdenum sulfide, and maintaining the catalyst body at a temperature within the range 400°–625° F. and under superatmospheric pressure.

14. A process of producing a propyl amine from nitropropane which comprises passing the nitropropane through a body of a hydrogenating catalyst comprising molybdenum sulfide supported on activated carbon, simultaneously introducing to the catalyst body hydrogen in the proportion of at least four times that required for the reduction of the nitropropane to propylamine and an active sulfur carrier in proportions sufficient to maintain the catalytic activity of the said molybdenum sulfide, and maintaining the catalyst body at a temperature within the range 400°–700° F.

15. A process of producing an amine which comprises subjecting a corresponding nitro compound to catalytic hydrogenation in the presence of a catalyst essentially consisting of a compound selected from the class of the sulfides of vanadium, columbium, tantalum, chromium, molybdenum and tungsten, under superatmospheric temperatures above 350° F. and under superatmospheric pressure sufficient to maintain both the initial nitro compound and the produced amine in liquid phase.

16. A process of producing aniline from mono-nitrobenzene which comprises continuously passing nitrobenzene into a reaction zone containing a hydrogenating catalyst comprising molybdenum sulfide, simultaneously introducing into the reaction zone hydrogen in a molecular ratio at least four times that theoretically required for the reduction of mono-nitrobenzene to aniline, simultaneously introducing into the reaction zone a gaseous active sulfur carrier in amounts sufficient to maintain an $H_2S$-equivalent of at least 50 grains per 100 cu. ft. in the gases effluent from the reaction zone, maintaining the temperature of the reaction zone within the range 450° and 650° F. and the pressure on the reacting substances within the reaction zone at least 400 lbs. per sq. in. gauge, and continuously removing produced aniline from the reaction zone.

17. A process which comprises forming an amine by hydrogenating the nitro group of an organic nitro compound, and catalyzing said reaction with molybdenum sulfide at a temperature of from about 350 to about 700° F.

18. A process which comprises forming an amine by hydrogenating the nitro group of an organic nitro compound, and catalyzing said reaction with molybdenum sulfide at a temperature of from about 450 to about 650° F.

19. A process which comprises forming an amine by hydrogenating the nitro group of an organic nitro compound, catalyzing said reaction with molybdenum sulfide at a temperature of from about 350 to about 700° F., and maintaining catalyst activity by effecting said hydrogenation in the presence of an active sulfur carrier.

20. A process which comprises forming an amine by hydrogenating the nitro group of an organic nitro compound, catalyzing said reaction with molybdenum sulfide at a temperature of from about 350 to about 700° F., and maintaining catalyst activity by effecting said hydrogenation in the presence of an active sulfur carrier selected from the group consisting of hydrogen sulfide, carbon disulfide, and a mercaptan.

21. A process which comprises forming an amine by hydrogenating the nitro group of an organic nitro compound, catalyzing said reaction at a temperature of from about 350 to 700° F. with molybdenum sulfide supported on a porous, catalytically inert carrier therefor.

22. A process which comprises forming an amine by hydrogenating the nitro group of an organic nitro compound, catalyzing said reaction at a temperature of from about 350 to 700° F. with molybdenum sulfide supported on activated carbon.

23. A process which comprises forming an amine by hydrogenating a nitro group of an aromatic nitro compound selected from the group consisting of nitro benzene and nitro xylenes, and catalyzing said reaction with molybdenum sulfide at a temperature of from about 350 to about 700° F.

24. A process which comprises forming an amine by hydrogenating a nitro group of a nitro hydrocarbon of the benzene series and catalyzing said reaction at a temperature in the range of from 350 to 700° F. with a sulfide selected from the group consisting of vanadium, columbium, tantalum, chromium, molybdenum and tungsten sulfides.

25. A process of producing xylidene from mono-nitroxylene which comprises passing nitroxylene into a reaction zone containing a hydrogenation catalyst comprising molybdenum sulfide, simultaneously introducing into the reaction zone hydrogen and hydrogen sulfide, maintaining the temperature within the range of 400° to 650° F.

26. A continuous method for producing xylidine by the catalytic reduction of nitro xylene which comprises continuously feeding nitro xylene, hydrogen and inert hydrocarbon diluent to a reaction zone containing a hydrogenation catalyst consisting of one of the class of molybdenum sulfide and tungsten sulfide on an activated charcoal carrier, at pressures between about 2000 pounds per square inch and about 3000 pounds per square inch and at a temperature between about 350° F. and about 650° F. and continuously removing xylidine from the reaction zone.

27. A process of producing xylidene from mono-nitro xylene which comprises passing nitro xylene into a reaction zone containing a hydrogenation catalyst comprising molybdenum sulfide, simultaneously introducing into the reaction zone hydrogen and carbon disulfide, and maintaining the temperature within the range of 400 and 650° F.

28. A process of producing an amine from an aromatic nitro compound which comprises passing an aromatic nitro compound into a reaction zone containing a hydrogenation catalyst comprising molybdenum sulfide, simultaneously introducing into the reaction zone hydrogen and an active sulfur carrier and maintaining the temperature in the reaction zone within the range of 400 and 650° F.

29. A process of producing aniline from mono nitro benzene which comprises passing nitro benzene into a reaction zone containing a hydrogenation catalyst comprising molybdenum sulfide, simultaneously introducing into the reaction zone hydrogen and an active sulfur carrier and maintaining the temperature within the range of 400 and 650° F.

PAUL C. CONDIT.

REFERENCES CITED

The following references are of record in the file of this patent:

UNITED STATES PATENTS

| Number | Name | Date |
|---|---|---|
| 1,207,802 | Schmidt | Dec. 12, 1916 |
| 1,662,421 | Herold et al. | Mar. 13, 1923 |
| 1,854,258 | Herold et al. | Apr. 13, 1932 |
| 2,039,259 | Pier et al. | Apr. 28, 1933 |
| 2,139,122 | Hass et al. | Dec. 6, 1938 |
| 2,166,971 | Schmidt et al. | July 25, 1939 |
| 2,198,249 | Henke et al. | Apr. 23, 1940 |
| 2,233,128 | Henke et al. | Feb. 25, 1941 |
| 2,233,129 | Henke et al. | Feb. 25, 1941 |
| 2,252,927 | Heard | Aug. 19, 1941 |
| 2,252,928 | Marschner | Aug. 19, 1941 |

FOREIGN PATENTS

| Number | Country | Date |
|---|---|---|
| 436,214 | Great Britain | Sept. 30, 1935 |

OTHER REFERENCES

Griffitts et al.: J. Phys. Chem., pp. 477–484, vol. 41 (1937).

Brown et al.: J. Phys. Chem., pp. 383–386, vol. 43 (1939).